3,160,608
WATER-SOLUBLE MELAMINE RESIN TEXTILE FINISH

Raymond Polansky, Middlesex, and William F. Herbes and Wendell P. Munro, Bridgewater Township, Somerset County, N.J., assignors to American Cyanamid Company, New York, N.Y., a corporation of Maine
No Drawing. Filed May 17, 1961, Ser. No. 110,623
4 Claims. (Cl. 260—67.6)

The present invention relates to water-soluble textile resin finishes and to the processes for treating textiles with such finishes. Further, the present invention relates to a novel method for preparing novel melamine resins suited for use in textile finishing having excellent solubility and stability characteristics.

Alkylated methylol melamine resins, and more particularly water-soluble methylated methylol melamines, have been prepared heretofore on numerous occasions. Many of the prior art procedures, such as those described in U.S. Patent No. 2,529,856, have discussed the preparations of methylated methylol melamines and in more or less specific terms have described methods for the preparation of such products having varying degrees of substitution, ranging from monomethyl monomethylol melamine to hexamethyl hexamethylol melamine.

Frequently, prior art references refer to the reaction products so prepared as having good stability and water solubility. In practice, it has been found that by adhering to the conditions described in such disclosures, many water-soluble melamine resins can be so prepared, as for example, trimethyl trimethylol melamine, tetramethyl pentamethylol melamine, and the like. However, it has been our experience that when these teachings were applied to the preparation of a substantially fully methylolated, substantially fully alkylated melamine, the resulting product did not possess the necessary degree of water solubility and stability of a textile resin.

For many of the uses for such reaction products, as for example, in the field of surface coatings, in the formation of laminating resins and the like, the quality of infinite water solubility and stability therein is not important. This is due to the fact that in most instances the melamine resins and other materials employed in the preparation of such compositions are "cut" or employed in organic solvent mediums, as for example, xylene, benzene and the like.

The reasons for the poor water solubility and stability characteristics of these substantially fully alkylated, substantially fully methylolated melamine resins of the prior art have been speculated upon a number of occasions. A strong body of opinion supports the theory that these deficiencies are developed in the product when it is attempted to obtain full alkylation. This is believed to be true in that in order to achieve substantially full alkylation of a substantially fully methylolated melamine, alkylation conditions, of necessity, must be severe with the result that the final product contains substantial portions of low order polymeric material which adversely affect the solubility and stability characteristics of the resin.

Recent efforts directed to the preparation of substantially fully alkylated, substantially fully methylolated melamines are described in copending U.S. application, Serial No. 595,452, filed July 9, 1956. The melamine resins described therein have broad utility and are, for the most part, acceptable for the use on cellulose-containing textile materials in that they produce shrinkage resistance or control and crease resistance, without objectionable discoloring due to chlorine retention when repeatedly bleached with chlorine. From a textile resin standpoint, however, they suffer from very serious physical limitations. These products, after preparation on standing and cooling to room temperature, become solid, having a "semi-crystalline" or wax-like consistency, a very undesirable condition for storing, shipping or handling in the mill. Furthermore, these products are difficult to dissolve in water at the time of making up the pad bath. To obtain solution, it is necessary to use high speed or special stirrers, surface active agents, undesirable solvents and heat. These limitations have substantially precluded their usage and acceptance by the textile finishing industry. These melamine condensates prepared in accordance with the above referred to copending application are not fully or infinitely water soluble at room temperature, once the difficulty of forming a solution has been accomplished, and further it has been noted that the degree of solubility of a product decreases as the temperature increases. As an example of this, a saturated solution of water and fully methylated methylol melamine representative of these products at 25° C. contained about 33% of the methylated product and about 67% of water. A saturated solution of the mixture of these components at 60° C. contained about 16% of the methylated product and about 84% of water. Products prepared in accordance with the procedure are prepared by etherifying or alkylating a low water content highly methylolated melamine.

On the other hand, procedures have been developed where relatively highly substituted methylated methylol melamines have been prepared without isolating the methylol melamine component, which melamines can be characterized by good water solubility and stability.

These latter products, while satisfactory for many purposes, have disadvantages, such as the fact that they usually or normally contain excess formaldehyde. In addition, such processes ignore the value of having an isolated relatively anhydrous stable product such as hexamethylol melamine which can be employed as an intermediate useful for making numerous melamine resins, which may be water-soluble or insoluble depending upon the ultimate end use of the product. In addition, such procedures ignore the fact that an isolated hexamethylol melamine is a valuable intermediate and is capable of numerous other end uses.

Accordingly, it is an object of the present invention to provide a substantially fully etherified, substantially fully methylolated melamine resin from a relatively anhydrous substantially fully methylolated melamine characterized by fluidity or stability in concentrated form, ease and rapidity of solution in water and highly satisfactory ultimate solubility.

It is a further and special object of the present invention to provide a substantially fully etherified, substantially full methylolated melamine resin from a relatively anhydrous substantially fully methylolated melamine characterized by fluidity or stability in concentrated form, ease and rapidity of solution in water, infinite water solubility and excellent stability.

It is a further object of the present invention to provide a process for preparing these resins.

It is a further object of this invention to provide a process for finishing textile material with such resins whereby excellent crease resistance and shrinkage control may be obtained.

It is a still further object to provide a process for finishing textile material with such resins whereby a finish resistant to chlorine retention and discoloration due to chlorine retention is obtained.

It is another object to provide a process for finishing textile material with such a resin whereby the above advantages are achieved with an unexpected softening of hand of the treated fabric.

These and other objects and advantages of the present invention will become more apparent from the detailed description set forth hereinbelow.

According to the present invention, a process is provided for preparing a substantially fully etherified, substantially fully methylolated melamine characterized by ease and rapidity of solution in water and excellent stability, which comprises reacting at a pH of less than 4 relative mole ratios of 1 mole of a substantially monomeric, substantially fully methylolated melamine containing less than 20% and preferably less than 10% by weight of water, with from between 12 and 24 moles of methanol and at least 0.1 mole of a compound selected from the group consisting of a monoalkyl ether of diethylene glycol, wherein the alkyl group contains 1–4 carbon atoms, and monalkyl ethers of ethylene glycol, wherein the alkyl group contains 1 to 3 carbon atoms.

The melamine reaction product of this invention may be characterized as being a substantially fully etherified, substantially fully methylolated melamine, further characterized by ease and rapidity of solution in water and excellent stability in which the etherifying groups are methyl, alkoxyethoxyethyl and alkoxyethyl.

By the expression "relatively anhydrous" as that term is employed herein, it is meant that the substantially fully methylolated melamine employed in the alkylation or etherification step of this process contains less than 20% by weight of water and preferably less than 10% by weight of water. Usually these melamines will contain between 2% and 10% by weight of water.

By the expression "substantially fully methylolated melamine" as it is used hereinafter, it is meant a product which contains a minimum of 5.8 moles of combined formaldehyde per mole of melamine and preferably up to 6.0 combined moles of formaldehyde per mole of melamine.

By the expression "substantially fully etherified" as it is employed herein, it is meant that substantially all of the available methylol groups (at least 5.6 groups) on the melamine have been reacted with methanol, and the selected monoalkyl ethers of diethylene glycol and ethylene glycol. In this connection, the etherifying groups are principally methyl with one mole of the product containing up to 2.5 moles of alkoxyethoxyethyl and/or alkoxyethyl groups and preferably from between about 0.25 and about 1 mole of such groups, the remaining etherifying groups being methyl.

By the expression "substantially monomeric" as that and similar terms are employed hereinafter, it is meant a reaction product which is composed substantially entirely of monomeric material and if polymeric materials are present, they are present in such small quantities as to not significantly adversely affect the solubility and stability characteristics of the resinous material.

By the expression "good stability" and similar expressions as they are employed herein, it is mean fluidity or stability in the concentrated form, for example, 85–95% solids, for at least six months at 25° C. and 37° C. In addition, the expression "good stability" and similar expressions as they are employed herein mean fluidity or stability in aqueous solutions at the ultimate or maximum solubility in water of the resin for at least six months at 25° C. and 37° C. In addition, whether in concentrated form or in aqueous solution, up to ultimate solubility, no solids appear on storage for these minimum times and at these temperatures.

By the expression "ease and rapidity of solution in water" as it and similar expressions may be employed herein, it is meant that condensates of this invention are readily solubilized in water by simple hand mixing of the condensate and water. Thus, the employment of special stirrers, dispersing agents, heat, and similar expedients is not required.

By the term "infinite water solubility" and similar expressions as they are employed herein, it is meant that the melamine condensate is miscible or soluble in water in any proportion.

The substantially fully methylolated melamine may be prepared in accordance with a number of procedures. In general, this intermediate may be prepared by reacting relative ratios of 1 mole of melamine with an excess of formaldehyde (more than 6 moles, as for example, from between 6.5 to 20 moles of formaldehyde) under alkaline conditions until the fully methylolated or hexamethylol melamine is produced.

As a specific example, the hexamethylol melamine may be prepared in accordance with the above-identified copending U.S. application, Serial No. 596,452, by heating with continuous mixing melamine and formaldehyde in a mole ratio of from 1:6.5 to 1:20, respectively, in the presence of about 45 to 75% by weight of water, based on the total weight of the reaction mixture, while maintaining a pH of betwen 7.0 and 8.5 at a temperature between 45 and 75° C. These reaction conditions are maintained until the reaction mixture has become clear or transparent. Thereafter, the temperature of the reaction mixture is maintained at beween 45 and 75° C. while stirring the reaction mixture without turbulence, until a major portion of the precipitated product is formed, after which the reaction mixture is cooled to a temperature of between 15 and 30° C. until substantially all of the product is precipitated. Thereafter, the fully methylolated product is concentrated so that the water content is below about 20%. Further and more specific details of this procedure will be described hereinafter in Example 1.

To substantially fully etherify a substantially fully methylolated melamine, a mole of the melamine-formaldehyde reaction product, such as that prepared by the described illustrative procedure, concentrated to a water content of less than 20%, between 3 and 12 moles and preferably between 5 and 10 moles of methanol and at least 0.1 mole and preferably between 0.25 and 1.0 mole of a suitable monoalkyl ether, are reacted at a temperature between 15 and 60° C. and preferably at from between 25 and 50° C. at a pH of less than 4 and preferably at less than 3.5 until a substantially clear solution is obtained. Thereafter, an additional quantity of methanol is added to the reaction mixture to provide a total methanol usage of between 12 and 24 moles per mole of melamine-formaldehyde reaction product and the reaction is continued until a completely clear solution is obtained. The pH of the reaction mixture is then adjusted to between 8 and 10, with a suitable alkali, such as caustic soda, potassium hydroxide, sodium carbonate and the like, and the resulting solution is filtered if necessary, and concentrated in vacuo until a viscose syrup is formed which is substantially free of unreacted alcohol in water.

While it is generally preferred, with respect to the above etherification procedure, to add the methanol in two portions, it should be noted that all of the methanol may be added initially, i.e., at the commencement of the etherification reaction.

While the above procedure has been described primarily in conjunction with the use of methanol as the principal alkylating agent, it should be noted that it is believed that other low order monohydric alcohols containing from 2–4 carbon atoms, including ethyl, propyl and butyl alcohols and/or mixtures of these alcohols may be employed in place of some or possibly all of the methanol. Methanol is greatly preferred because of the much superior water solubility of the product prepared with it.

The monoalkyl ethers of diethylene glycol employable in the present invention include those ethers wherein the alkyl group contains from 1 to 4 carbon atoms or mixtures thereof, as represented by methyl, ethyl, propyl, isopropyl, butyl, isobutyl, secondary butyl and tertiary butyl groups. Of these ethers, the ethyl ether is greatly preferred in that the resulting product is characterized by outstanding miscibility or solubility in water, i.e., solubility in any proportion, is easily and rapidly solubilized, and is stable at any concentration over a temperature range of from 0° C. to 50° C.

The monoalkyl ethers of ethylene glycol employable in the present invention include those ethers wherein the alkyl group contains from 1 to 3 carbon atoms or mixtures thereof as represented by methyl, ethyl, propyl and isopropyl.

The monoalkyl ethers of ethylene glycol and the monoalkyl ethers of diethylene glycol, other than the monoethyl ether, are characterized by generally poorer ultimate or maximum solubility than the monoethyl ether of diethylene glycol, but are characterized by the same ease and rapidity of solution and excellent stability, i.e., stable for at least six months at 25° C. and 37° C. in concentrated form or solution, and thus are dramatically superior with respect to prior art fully etherified, fully methylolated melamines as textile resins.

Thus, while the ultimate or maximum solubility of the preferred product prepared with methanol and the monoethyl ether of diethylene glycol is infinitely soluble, the monomethyl ether of diethylene glycol product requires at least 5 parts of water and the monobutyl ether of diethylene glycol requires at least 10 parts of water. With respect to products which are prepared employing the monoalkyl ethers of ethylene glycol, as for example, the monomethyl and monoethyl, are equal in solubility to products prepared employing the monobutyl ether of diethylene glycol, that is, ultimate solubility or miscibility is achieved in a minimum of 10 parts of water.

With respect to these less preferred species of this invention, i.e., those which are not fully water soluble, if less than the minimum amount of water is added to the concentrated resin, two phases exist, an aqueous and a resin phase. When the required amount of water has been added, the phases disappear and a homogeneous solution remains.

The amount of monoalkyl ether employed in the present invention may range from between 0.1 up to 2.5 moles per mole of methylol melamine. The recommended amount is about 0.5 mole per mole of methylol melamine. Larger amounts, up to 2.5 moles per mole of methylol melamine and higher, appear to have little, if any, effect on the properties of the final resin product. However, the use of larger amounts of these monoalkyl ethers introduces certain process limitations. If the vacuum concentration is carried to the normal internal temperature, the resulting resin will have a lower solids content, or if the concentration is carried to a higher temperature to remove the excess monoalkyl ether, there is danger of polymerizing the reaction product, with the result that it will be less stable and water soluble than those resins contemplated by this invention.

The necessity of having a monoalkyl ether present during the etherification step and the strong probability that the ether enters into the alkylation is indicated clearly by the fact that a physical mixture of a hexamethyl hexamethylol melamine and a monoethyl ether of diethylene glycol is not stable but crystallizes from solution in a short time.

The further fact that the monoalkyl ethers specified herein represent a unique class of alcohols for use in this invention, insofar as their capacity to impart easy and rapid solubility and excellent stability to substantially fully etherified, substantially fully methylolated melamine, is also evidenced by the fact that other selected and closely akin alcohol materials fail to produce this improved result. Both of these aspects of the present invention will be more clearly illustrated in the examples to follow hereinafter.

The substantially fully etherified, fully methylolated melamine resins of this invention and particularly that prepared employing the monoethyl ether of diethylene glycol, are soluble or miscible in water in all proportions, and are stable, i.e. present in a clear appearance after at least six months at 25° C. and 37° C. The products obtained from the other monoalkyl ethers of diethylene glycol and monoalkyl ethers of ethylene glycol are less soluble than those obtained employing this preferred species, but in turn constitute a substantial and significant improvement over previously available fully etherified and fully methylolated melamines as textile resins.

The etherification temperatures may be from between 15 and 60° C. and preferably are from between 25 and 50° C. Temperatures significantly outside the above-indicated ranges are undesirable in that either the reaction occurs too slowly and cannot be moved to completion in reasonable periods of time or if higher than 60° C. the danger of polymerization is present.

The pH at which the etherification reaction is carried out must be below 4 and preferably below 3.5. The necessary pH is normally obtained by adjustment with a strong mineral or organic acid such as sulfuric, hydrochloric, nitric or paratoluene sulfonic acid. Of these, sulfuric and nitric acid are preferred.

The water-soluble and stable, substantially fully etherified, substantially fully methylolated melamine products of this invention are applied to textile materials and preferably textile materials containing at least 50% of cellulose, in order to impart shrinkage control and wrinkle resistance thereto. By employing the products of this invention, these advantages may be achieved without the discoloration or yellowing long associated with melamine resin finishes, due to chlorine retention from repeated chlorine bleachings. Treatment with the substantially fully etherified and substantially fully methylolated melamines of this invention, in addition to producing the desired results specified hereinabove, results in producing an unexpectedly soft hand or finish to the textile material so treated. This is in sharp distinction with the effect normally achieved through the application of melamine resins and thermosetting resin, generally to cellulose textile fabrics which is a tendency to harshen the hand.

The resin of this invention are applied to the textile material, preferably a formed cellulose fabric, with a suitable curing catalyst. The resinous composition and catalyst may be applied by any conventional finishing technique such as immersion, padding, spraying and the like, and followed, where necessary, by squeezing, hydro-extraction or similar processes in order to affix the desired amount of resin solid onto the fabric.

The method of application should be such that from about 1 to about 15%, and in some instances higher amounts of the melamine resin products, based on the weight of the fabric, are deposited thereon. Within certain limits, the amount of resin applied depends upon the particular type of fabric being treated. Thus, when treating fabrics consisting of fibrous cellulosic material, the concentration of the order of from about 1 to 15% and more particularly from 3 to 10% resin solids, based on the weight of the dried fabric, is employed.

The catalyst utilized may consist of the type comprising free acid, acid salts, alkanolamine salts, and the like. The concentration of catalyst employed may range from between about 0.1 to about 25% or higher, based on the weight of the resin solids, depending upon the particular catalyst type employed. Thus, for example, from between about 0.1 and about 10% of free acid, such as phosphoric, tartaric, oxalic or the like, may be employed, while in the case of ammonium chloride, amounts of from between 0.5 and about 10% are used. In the case of amine salts, including alkanolamine salts, from about 1.0 to about 10% are most useful, while with respect to salts such as magnesium chloride, amounts of between about 5 and about 25% have been successfully employed. In all instances, the concentration of the catalyst is based on the weight of resin solids employed.

Following the application of the resin and curing catalyst to the textile fabric, the material is subjected to the drying and curing operation to effect desired improved properties. The drying and curing operations may be carried out in a single step or in separate steps. The temperature at which drying and curing operations are effected vary widely and are influenced, to some extent, by the type of catalyst employed. Normally, the range of temperature extends from about 180° F. to about 450° F. or even higher. Generally speaking, the time of the drying and/or curing operation is inversely proportional to the temperature employed and, of course, is influenced by whether or not separate or combined drying and curing steps are employed.

Generally, when drying and curing is carried out in a combined operation, a time of from about 1 minute to 10 minutes may be employed at temperatures from about 450 to 250° F., respectively. When the fabric has been dried preliminary to curing, curing times of the order of from 5 minutes to about ¼ minute at a temperature of from between 250 and 450° F. respectively, have been successfully employed.

In order to better illustrate the present invention, the following examples are given primarily by way of illustration. All parts and percentages contained therein are by weight unless otherwise specifically designated.

EXAMPLE 1

*(Preparation of Hexamethylol Melamine)*

Into a suitable reaction vessel, 386 parts (4.76 moles) of formalin (37% formaldehyde solution) was charged and the pH of the reaction mixture was adjusted to between 7.4 and 7.5 with sodium bicarbonate. The formaldehyde solution was then heated to between 55 and 65° C. and 80 parts (0.635 mole) of melamine were charged and mixed with vigorous agitation. The mole ratio of melamine to formaldehyde was 1:7.5. During solution of the melamine, the pH was found to increase to between 8.2 and 8.5 as a result of the reaction taking place. The amount of water was about 52%, based on the total weight of the reaction mixture.

When the solids had gone into solution, the speed of the mixing means was greatly reduced, but sufficient to provide a low degree of mixing with little or no agitation or turbulence. The temperature of the reaction mixture was held between 60 and 65° C. for one hour under these conditions of mixing, during which period better than 60% of the solid methylol melamine reaction product was precipitated from the reaction mixture. After the one-hour period, cooling was initiated such that the cooling rate did not exceed 15° C. per hour. Mixing without turbulence was employed during this period.

During the cooling cycle, additional water was added, as required by the apparent viscosity of the slurry, to adjust the water content from 52 to a content of 65%, based on the total weight of the reaction mixture. After cooling to 30° C. the solids were washed with water in an Oliver rotary vacuum filter, removing approximately 80% of residual formaldehyde from the product. The washed cake was then dried at 50° C. until substantially dry. The product contained about 5% free moisture. A yield of better than 90% of theory was realized.

EXAMPLE 2

612 parts (2.0 moles) of a substantially monomeric hexamethylol melamine prepared in accordance with the procedure of Example 1, 512 parts (16 moles) of methanol, 134 parts (1.0 mole) of monoethyl ether of diethylene glycol and 3.7 parts (0.37 mole) of concentrated sulfuric acid (sufficient to adjust the pH to about 3.0) were placed in a suitable reaction vessel and stirred while maintaining a temperature of 40° C. for two hours. Thereafter, 512 parts (16 moles) of additional methanol were added to the reaction vessel.

The mole ratio of methanol to methylol melamine was approximately 16:1 and the mole ratio of monoethyl ether of diethylene glycol to methylol melamine was approximately 0.5:1.

Stirring was continued for an additional 2 hours while maintaining the temperature at 40° C. and thereafter the pH was adjusted to a value between 8 and 10 with caustic soda. The reaction mixture was then filtered and the filtrate was concentrated under a vacuum of 26 to 28 inches of mercury until the "pot" temperature reached 80° C. The syrupy product weighed 814 parts and contained 84% solids. It was easily soluble in water in all proportions and was fluid and clear after six months at 25° C. and 37° C.

EXAMPLE 3

612 parts (2.0 moles) of a fully methylolated melamine prepared in accordance with Example 1, 320 parts (10 moles) of methanol, 268 parts (2.0 moles) of monoethyl ether of diethylene glycol and 3.7 parts (0.037 mole) of concentrated sulfuric acid in amount sufficient to adjust the pH to 2.8, was continuously stirred while maintaining a temperature of 30° C. for 1 hour. Thereafter, 704 parts (22 moles) of methanol were added. The mole ratio between the methanol and methylol melamine was approximately 16:1, and the mole ratio between the monoethyl ether of diethylene glycol and methylol melamine was 1:1.

The stirring was continued for 2 hours at 30° C. and thereafter the pH was adjusted to 9.9 with caustic soda. After filtering to remove insolubles (including sodium sulfate crystals) the filtrate was concentrated under a vacuum of 26 to 28 inches of mercury until the "pot" temperature reached 80° C. The syrupy residue weighed 749 parts and contained 92.7% solids. The product was easily soluble in water in all proportions and was fluid and still clear after six months at 25° C. and 37° C.

EXAMPLE 4

The same procedure was followed as in Example 2, except that 580 parts (18 moles) of methanol were employed during the first alkylation and 444 parts or 14 moles of methanol were employed in the second alkylation. Additionally, stirring was carried out for 2 hours at 40° C. during the first alkylation (pH of 2.55) and for 3 hours at 40° C. during the second. (pH of 2.50.)

779 parts of product containing 87.6% solids was easily and infinitely soluble and stable after six months at 25° C. and 37° C.

EXAMPLE 5

The same general procedure as outlined in Example 4 was followed, except that the mole ratio of the monoethyl ether of diethylene glycol to melamine was 0.25:1 in that 67 parts (0.5 mole) of the monoethyl ether were employed.

Additionally, after the first charge of methanol stirring was continued for 2 hours at 30° C. and after the second charge stirring was continued for 4 hours at 30° C.

The resulting product was 608 parts containing 92.7% solids and was easily and infinitely soluble and stable after six months at 25 and 37° C.

EXAMPLE 6

A procedure similar to that of Example 2 was followed, except that 2.5:1 was the mole ratio between the monoethyl ether of diethylene glycol and melamine.

In addition, 352 parts (11 moles) of methanol were employed in the first alkylation step and 512 parts (16 moles) were employed in the second step for a total methanol-to-melamine charge of 13.5 moles to 1.

The resulting product, after concentration in vacuo to 80° C., contained 1290 parts at 59% solids. This product was infinitely soluble and stable for more than six months at 25° C. and 37° C.

EXAMPLE 7

The procedure of Example 4 was followed, with the exception that the total methanol charged was such as to provide a mole ratio of 21:1, methanol to melamine.

This mole ratio was obtained by employing 580 parts (18 moles) of methanol in the first alkylation and 764 parts (24 moles) in the second.

Stirring during the first alkylation period was for 2 hours at 30° C. and during the second methylation was for 3 hours at 30° C.

The reaction product was infinitely and easily soluble in water and stable at 25° C. for more than six months.

EXAMPLE 8

The same general procedure as was followed in Example 4 was adhered to here, except that half as much sulfuric acid, namely 1.8 parts (0.018 mole) of concentrated sulfuric acid was employed. The pH of the reaction mixture during methylation was thus 4.1.

The reaction product was not miscible with water.

EXAMPLE 9

The same general procedure as adhered to in Example 4 was adhered to here except that ¾ as much sulfuric acid, namely 2.7 parts (0.027 mole) of concentrated sulfuric acid was employed. The pH during etherification was 3.45. The reaction product was clear and infinitely soluble in water, and stable after six months at 25° C.

EXAMPLE 10

The same general procedure as followed in Example 4 was followed here, except that the mole ratio between the monoethyl ether of diethylene glycol and melamine was 1:1.

In addition, a 50% increase in the amount of sulfuric acid catalyst namely 5.5 parts (0.55 mole) of sulfuric acid were employed (pH was less than 2.5) and stirring during the reaction period for the first charge of methanol was for 2 hours at 30° C. and for the second charge 3 hours at 30° C.

The reaction product was infinitely and easily soluble in water and stable after six months at 25° C. and 37° C.

EXAMPLE 11

In order to illustrate that a monoalkyl ether of diethylene glycol employable in accordance with the present invention is reacted with the methylol melamine and functions to provide infinite solubility and good stability, 76 parts of a hexamethyl hexamethylol melamine prepared in accordance with prior art procedures were heated to 80° C. and 8.6 parts of the monoethyl ether of diethylene glycol and 15.4 parts of water were added. The resulting product crystallized overnight at room temperature. Substitution of 4.8 parts methanol and 10.6 parts water for the 15.4 parts water resulted in a product which also crystallized at room temperature overnight.

EXAMPLE 12

The procedure followed was substantially the same as that employed in Example 2 hereinabove, except that 120 parts (1.0 mole) of the monomethyl ether of diethylene glycol was substituted for the monoethyl ether. The product weighed 794 parts, contained 85.2% solids, and was easily soluble to the extent of one part in 5 or more parts of water. It was not miscible with less than about 5 parts of water. The product was fluid and stable for more than six months at 25° C.

EXAMPLE 13

The procedure of Example 2 was carried out with the exception that 162 parts (1.0 mole) of the monobutyl ether of diethylene glycol was substituted for the monoethyl ether. The reaction product was 817 parts containing 90.0% solids. The product was easily miscible with up to 0.5 part and over 10 parts of water, but not miscible with amounts between 0.5 and 10 parts of water. The product was fluid and stable for more than six months at 25° C.

EXAMPLE 14

The procedure of Example 2 was carried out with the exception that 76 parts (1.0 mole) of the monomethyl ether of ethylene glycol was substituted for the monoethyl ether of diethylene glycol. The product weighed 514 parts (96.6% solids) and was not miscible with less than 10 parts of water. (See Examples 12 and 13.) The product was fluid and stable for more than six months at 25° C.

EXAMPLE 15

The procedure of Example 2 was carried out, except that 90 parts (1.0 mole) of the monoethyl ether of ethylene glycol was substituted for the monoethyl ether of diethylene glycol. The product weighed 678 parts (containing 97.6% solids) and was not miscible with less than 10 parts of water. The product was fluid and stable for more than six months at 25° C.

EXAMPLE 16

This experiment was carried out in accordance with the procedure set forth in Example 2 with the exception that 118 parts (1.0 mole) of the mono-n-butyl ether of ethylene glycol was substituted for the monoethyl ether of diethylene glycol. The reaction product weighed 658 parts, contained 86.5% total solids and was insoluble in water.

EXAMPLE 17

330 parts of the methylol melamine prepared in accordance with Example 1, 320 parts of methanol and 10 parts of concentrated sulfuric acid sufficient to adjust the pH to between 1 and 1.5 were charged into a suitable reaction vessel. The mole ratio between the methanol and the methylol melamine was 10:1, respectively. Stirring of the reactants was continued until a slightly hazy solution was obtained. This is achieved in about 1 hour and then the pH of the reaction mixture was adjusted to 8 with alkali. After this adjustment, the water and excess alcohol were distilled off in vacuo, keeping the temperature below 50° C. The residue was filtered to yield a clear, water-white product which upon cooling formed a solid. The yield was 90%. The product so formed, which may be designated a hexamethyl ether of hexamethylol melamine, can be dissolved in water only with difficulty, requiring special conditions such as high speed stirring, use of surface active agents, and advantageous heating to melt the solid. The ultimate solubility is 1 part in at least 2 parts of water at the most ideal temperature (25° C.).

EXAMPLE 18

This process was carried out as in Example 2 hereinabove, substituting 46 parts (1.0 mole of ethanol for the monoethyl ether of diethylene glycol. The reaction product weighed 666 parts and was insoluble in water.

EXAMPLE 19

This process was carried out as in Example 2, with the exception that 60 parts (1.0 mole) of n-propanol was substituted for the monoethyl ether of diethylene glycol. The product weighed 772 parts, contained 93.0% solids, and was insoluble in water.

EXAMPLE 20

This process was carried out as in Example 2 hereinabove, with the exception that 74 parts (1.0 mole) in n-butanol was substituted for the monoethyl ether of diethylene glycol. The product weighed 631 parts, contained 98.8% total solids and was insoluble in water.

EXAMPLE 21

In Table I hereinbelow, the results are recorded for the finishing of 80 square cotton fabric with various exemplary melamine products produced in accordance with the present invention and a substantially fully methylated, substantially fully methylolated melamine, which material is extremely difficultly water-soluble, and a water-soluble trimethyl trimethylol melamine.

In this example, the 80 square cotton fabric was padded through a pad bath containing melamine resin and magnesium chloride as a curing accelerator therefor and then treated on a microset padder to obtain a wet pick-up of 80%. The amount of resin in the pad bath was 6.25% and the amount applied to the fabric was 5%, based on its dry weight. The amount of catalyst employed was 18%, based on the weight of the resin solids. The treated fabric was dried for 2 minutes at 225° F. and cured for 1 minute at 350° F., except where indicated otherwise. The wrinkle recovery was measured on a Monsanto wrinkle recovery tester, following the tentative test method 66–56, described on page 139 of the 1956 Technical Manual and Yearbook of the American Association of Textile Chemists and Colorists, volume 32.

The tensile strength was measured on a Scott tensile tester according to the ASTM standards.

The tear strength was measured by the standard Elmendorf test.

The yellowing index is calculated by the equation:

$$\text{Yellowing index} = 70\left(1 - \frac{R_{455}}{R_{577}}\right)$$

where $R_{455}$ and $R_{577}$ are reflectance values obtained on a recording spectrophotometer, using a magnesium carbonate as a reference standard, at the wave lengths of 455 m$\mu$ and 577 m$\mu$, respectively.

The strength loss due to chlorine retention was measured by the tentative test method 69–52 described on page 103 of the above-identified reference.

The wash referred to under "Wrinkle Recovery" was carried out by the procedure described under test method 14–53 on page 106 of the above-mentioned reference, and the wash referred to under "Yellowing Index" consisted of a 15-minute wash cycle at 140° F. in a solution containing 0.01% soap and 0.02% available chlorine at a liquor to cloth ratio of 7:1 in a Laundromat washer. Following bleaching, the fabrics were rinsed in water at 140° F. for three 5-minute cycles and then tumble dried at from 140 to 145° F. for 30 minutes.

By "textile material" as that term is employed herein, it is meant filaments, fibers, yarns and fabrics, whether they be woven or non-woven or otherwise formed.

The melamine resins of this invention may be employed with other textile finishing resins, either thermosetting or thermoplastic, to improve the durability of such finishes. Thus, for example, the resinous products of this invention may be employed with urea-formaldehyde resins, ethylene urea-formaldehyde resins, 1,2-propylene urea-formaldehyde resins, 1,3-propylene urea-formaldehyde resins, guanamine-formaldehyde resins, and their alkylated derivatives. Among the thermoplastic resins which may be mentioned are homopolymers and copolymers of lower alkyl acrylates, such as methyl acrylates, ethyl acrylates, butyl acrylates, methyl methacrylate, butyl methacrylate, or copolymers of these or their equivalents with styrenes, including ring and chain substituted styrenes, acrylonitrile, polyvinyl chloride, and the like. In addition, the melamine-formaldehyde resins of this invention may be employed with softeners, stiffeners, lubricants, dicyanamide, and other conventional treating bath components.

This application is a continuation-in-part of our copending application, Serial No. 732,814, filed May 5, 1958.

We claim:

1. A process for preparing a substantially fully etherified, substantially fully methylolated melamine, characterized by ease and rapidity of solution in water and excellent stability, which comprises reacting a substantially monomeric, substantially fully methylolated melamine containing less than 20% by weight of water with from 5 to 10 moles of methanol and at least 0.1 mole and up to about 2.5 moles of a compound selected from the group consisting of monoalkyl ethers of diethylene glycol wherein the alkyl group contains from 1 to 4 carbon atoms and monoalkyl ethers of ethylene glycol wherein the alkyl group contains from 1 to 3 carbon atoms, per mole of methylolated melamine at a temperature of between 15 and 60° C. and at a pH of less than 4, until a substantially clear solution is obtained, thereafter adding an additional quantity of methanol in an amount so that the total charge of methanol is from between 12 and 24 moles, continuing

TABLE I

|  | Untreated | A | B | C | D | E |
|---|---|---|---|---|---|---|
| Product of Example 3 |  | + |  |  |  |  |
| Product of Example 4 |  |  | + |  |  |  |
| Product of Example 6 [1] |  |  |  | + |  |  |
| Hexamethyl hexamethylol melamine |  |  |  |  | + |  |
| Trimethyl trimethylol melamine |  |  |  |  |  | + |
| Tensile Strength (lbs. total) | [2] 101 | 60 | 64 | 76 | 56 | 61 |
| Tear Strength (lbs. total) | 2.93 | 1.53 | 1.48 | 2.03 | 1.38 | 1.9 |
| Strength loss due to chlorine (percent) | <10.0 | <10.0 | <10.0 | <10.0 | <10.0 | <10.0 |
| Yellowing Index: |  |  |  |  |  |  |
| Initial | [2] 1.17 | 2.2 | [2] 1.8 | 1.54 | 2.4 | 2.0 |
| After 16 washes | 0.6 | 3.7 | [2] 2.6 |  | 3.9 | 11.5 |
| After 25 washes | 0.56 | 6.4 |  | 3.60 | 7.5 | 14.0 |
| Hand | Std. | v. sl. softer | Sim. |  | sl. firmer | Firm |

[1] Cured 2.0 min. at 330° F.
[2] Average of two fabric treatments.

Table I hereinabove indicates that the fully etherified, substantially fully methylolated melamine prepared in accordance with this invention is superior in application properties to conventional prior art melamine resins, as for example, trimethyltrimethylol melamine, as well as prior art hexamethyl hexamethylol melamine.

The products of this invention are preferable for finishing cellulosic textile materials, including cotton textile materials, regenerated cellulose textile materials, such as viscose, and cuprammonium rayon and the like, either alone or in combination with other textile materials, where the cellulosic portion constitutes at least 50% of the textile material employed. Thus, for example, the cellulosic textile material may be blended with other synthetic or natural fibers, as for example, nylon, acrylic polyester, linen, wool fibers and the like.

the reaction until a completely clear solution is obtained and thereafter adjusting the pH to between 8 and 10.

2. A process according to claim 1 in which at least 0.1 mole and up to about 2.5 moles of the monoethyl ether of diethylene glycol is employed during etherification and the substantially fully etherified, substantially fully methylolated melamine is characterized by infinite solubility in water and excellent stability.

3. A process for preparing a substantially fully etherified, substantially fully methylolated melamine characterized by ease and rapidity of solution in water and excellent stability, which comprises reacting a substantially monomeric, substantially fully methylolated melamine containing less than 20% by weight of water with from between 5 and 10 moles of methanol and from between 0.25 and 1 mole of a compound selected from the group consisting of monoalkyl ethers of diethylene glycol wherein the alkyl group contains from 1 to 4 carbon atoms and monoalkyl ethers of ethylene glycol wherein the alkyl group contains from 1 to 3 carbon atoms at a temperature of between 25 and 50° C. and at a pH of less than 4 until a clear solution results, adding an additional quantity of methanol in an amount so that the total charge of methanol is between 12 and 24 moles, continuing the reaction until a completely clear solution is obtained, and thereafter adjusting the pH of the solution to between 8 and 10.

4. A process according to claim 3 in which from between 0.25 and 1 mole of the monoethyl ether of diethylene glycol is employed during etherification and in which the substantially fully etherified, substantially fully methylolated melamine is characterized by infinite solubility in water and excellent stability.

References Cited in the file of this patent

UNITED STATES PATENTS

| | | |
|---|---|---|
| 2,197,357 | Widmer et al. | Apr. 16, 1940 |
| 2,454,495 | Widmer et al. | Nov. 23, 1948 |
| 2,456,568 | Scott et al. | Dec. 14, 1948 |
| 2,529,856 | West et al. | Nov. 14, 1950 |
| 2,645,625 | Bonzagni | July 14, 1953 |
| 2,709,693 | Widmer | May 31, 1955 |
| 2,715,619 | Suen | Aug. 16, 1955 |
| 2,764,574 | Widmer | Sept. 25, 1956 |
| 2,892,810 | Albrecht et al. | June 30, 1959 |